(12) United States Patent
Yan

(10) Patent No.: US 11,094,216 B2
(45) Date of Patent: Aug. 17, 2021

(54) SYSTEM AND METHOD FOR MUSIC SCORE SIMPLIFICATION

(71) Applicant: SUNLAND INFORMATION TECHNOLOGY CO., LTD., Shanghai (CN)

(72) Inventor: Bin Yan, Shanghai (CN)

(73) Assignee: SUNLAND INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/512,473

(22) Filed: Jul. 16, 2019

(65) Prior Publication Data

US 2019/0340950 A1 Nov. 7, 2019

Related U.S. Application Data

(63) Continuation of application No. PCT/CN2017/071234, filed on Jan. 16, 2017.

(51) Int. Cl.
*G09B 15/02* (2006.01)
*G09B 15/00* (2006.01)
*G10H 1/00* (2006.01)

(52) U.S. Cl.
CPC ......... *G09B 15/023* (2013.01); *G09B 15/002* (2013.01); *G10H 1/0066* (2013.01); *G10H 2240/155* (2013.01)

(58) Field of Classification Search
CPC .. G09B 15/023; G09B 15/002; G10H 1/0066; G10H 2240/155
See application file for complete search history.

(56) References Cited

U.S. PATENT DOCUMENTS

| 5,533,903 A | * | 7/1996 | Kennedy | G09B 5/065 345/473 |
| 5,728,960 A | * | 3/1998 | Sitrick | G10G 1/00 84/477 R |

(Continued)

FOREIGN PATENT DOCUMENTS

| CN | 102568261 A | 7/2012 |
| CN | 104167121 A | 11/2014 |

(Continued)

OTHER PUBLICATIONS

International Search Report in PCT/CN2017/071234 dated Oct. 23, 2017, 6 pages.

(Continued)

*Primary Examiner* — Christina M Schreiber
(74) *Attorney, Agent, or Firm* — Metis IP LLC

(57) ABSTRACT

A musical system may include one or more storage media, at least one processor, one or more sensors corresponding to keys of a musical instrument, and a display. The storage media may be configured to store a set of instructions for modifying a music score for a user based on a performance level of the user. The at least one processor may be configured to communicate with the one or more storage media. When executing the set of instructions, the processor is directed to determine a user performance level of a user and provide a modified music score for the user based on the user performance level. The sensors may be configured to sense a motion of at least one key of the keys and generate a key signal accordingly. The display may be configured to display the modified music score.

20 Claims, 14 Drawing Sheets

(56) References Cited

U.S. PATENT DOCUMENTS

| | | | |
|---|---|---|---|
| 6,072,113 | A | 6/2000 | Tohgi et al. |
| 6,211,451 | B1 * | 4/2001 | Tohgi ..................... G09B 5/065 |
| | | | 434/323 |
| 6,348,648 | B1 * | 2/2002 | Connick, Jr. ........ G09B 15/023 |
| | | | 84/477 R |
| 7,030,307 | B2 | 4/2006 | Wedel |
| 7,199,298 | B2 * | 4/2007 | Funaki ................ G09B 15/003 |
| | | | 84/470 R |
| 7,439,438 | B2 | 10/2008 | Hao |
| 8,481,838 | B1 * | 7/2013 | Smith .................... G09B 15/00 |
| | | | 84/609 |
| 8,629,342 | B2 * | 1/2014 | Lee ........................ G09B 15/04 |
| | | | 84/610 |
| 10,657,934 | B1 * | 5/2020 | Kolen .................... G06N 3/084 |
| 2001/0054347 | A1 * | 12/2001 | Uehara ................ G09B 15/023 |
| | | | 84/477 R |
| 2003/0167903 | A1 | 9/2003 | Funaki |
| 2004/0196747 | A1 * | 10/2004 | Jung .................... G10H 1/0066 |
| | | | 369/30.04 |
| 2004/0221707 | A1 | 11/2004 | Hiratsuka et al. |
| 2005/0204901 | A1 | 9/2005 | Hasebe |
| 2008/0168892 | A1 | 7/2008 | Uehara |
| 2008/0229908 | A1 * | 9/2008 | Sasaki ..................... G10H 1/346 |
| | | | 84/600 |
| 2009/0031884 | A1 | 2/2009 | Arai et al. |
| 2011/0003638 | A1 * | 1/2011 | Lee ..................... A63F 11/0051 |
| | | | 463/35 |
| 2016/0259717 | A1 | 9/2016 | Nychis et al. |
| 2017/0084260 | A1 * | 3/2017 | Watanabe .............. G10H 1/383 |
| 2019/0340950 | A1 * | 11/2019 | Yan ....................... G09B 15/023 |

FOREIGN PATENT DOCUMENTS

| | | | | |
|---|---|---|---|---|
| CN | 105118352 | A | | 12/2015 |
| CN | 105741821 | A | | 7/2016 |
| EP | 0933749 | A2 | * | 8/1999 ............. G09B 5/065 |
| JP | 2007241026 | A | * | 9/2007 |
| JP | 2007241026 | A | | 9/2007 |
| KR | 20140078195 | A | | 6/2014 |
| KR | 20140078789 | A | | 6/2014 |

OTHER PUBLICATIONS

Written Opinion in PCT/CN2017/071234 dated Oct. 23, 2017, 4 pages.

First Office Action in Chinese Application No. 201780083553.X dated Nov. 6, 2020, 28 pages.

Nnoboru, F et al., Study on Accurate Estimation of Musical Information in Musical Performance, SICE Annual Conference 2011, 2011, 4 pages.

Chi, Yaodan et al., On the Piano Automatic Performance System, Modem Manufacturing Technology and Equipment, 2015, 3 pages.

* cited by examiner

Report

Perfect  Correct  Incorrect 163 96 15

ERROR RATE = 5.5%

Incorrectly played

Notes: ♪ (La)

Rhythm: La-La-La

Chord: C Major triad

SYSTEM AND METHOD FOR MUSIC SCORE SIMPLIFICATION

CROSS-REFERENCE TO RELATED APPLICATIONS

This application is a continuation of International Application No. PCT/CN2017/071234 filed on Jan. 16, 2017, which designates the United States of America, the contents of which are incorporated herein by reference in their entirety.

TECHNICAL FIELD

The present disclosure generally relates to a music teaching system, and more particularly, to a system and method for music score simplification.

BACKGROUND

Learning to play a musical instrument (e.g., piano, violin, cello, etc.) may be challenging. For example, a piano student (especially a beginning student) may find it difficult to learn fingering and hand positions, fingering sequences, pedaling techniques, and other piano techniques. It may take enormous amounts of repetition for a music student to learn particular sections of a music score and/or specific techniques. Analysis of the music student's practice of the sections of the music score can be beneficial to the musical student. Accordingly, it is desirable to provide a visualized and personalized system and method to assist in learning a musical instrument.

SUMMARY OF THE INVENTION

According to an aspect of the present disclosure, a musical system may include one or more storage media, at least one processor, one or more sensors corresponding to one or more keys of a musical instrument, and a display. The storage media may be configured to store a set of instructions for modifying a music score for a user based on a performance level of the user. The at least one processor may be configured to communicate with the one or more storage media. In some embodiments, when executing the set of instructions, the processor is directed to determine a user performance level of a user and provide a modified music score for the user based on the user performance level. The sensors may be configured to sense a motion of at least one key of the keys and generate a key signal accordingly. The display may be configured to display the modified music score.

In some embodiments, the user performance level may be determined based on characteristics of the user's performance which is determined based on statistics of the user's historical performance records.

In some embodiments, the modified music score may be an individualized modified music score based on the characteristics of the user's performance. The characteristics of the user's performance may include the user's habitual performance.

In some embodiments, the system may further include one or more sensors corresponding to one or more keys of a musical instrument. Each of the sensors may be configured to sense a motion of at least one key of the keys and generate a key signal accordingly. To obtain the user's historical performance records, the processor may be further directed to receive one or more keys signals associated with a performance of the music score. For each of the key signals, the processor may be further directed to compare the key signal with a corresponding reference signal in a reference music score, determine an error based on the comparison and record a result of the determination as a historical performance record.

In some embodiments, to obtain the statistics of the user's historical performance records, the processor may be further directed to divide the reference music score into one or more music units that may corresponds to at least one reference key signal, compare the key signals with the reference signals according to the music units and determine an accuracy rate or an error rate based on the comparison.

In some embodiments, to obtain the modified music score, the processor may be further directed to remove a first portion of the music score and keep at least a second portion of the music score.

In some embodiments, the first portion of the music score may include one or more music units. An error rate of the music units played by the user may be higher than a predetermined threshold value. The second portion of the music score may correspond to a main theme of the music score.

In some embodiments, the system may further be configured to auto play the first part of the music score.

In some embodiments, the statistics of the user's historical performance records may be a number of notes, a number of chords, a type of tone, an accuracy rate, an error rate, notes played incorrectly, an incorrect rhythm, a type of chords played incorrectly, an incorrect time point relating to a depression of a key, an incorrect time point relating to a release of the key, an incorrect strength applied to the key, or an incorrect note duration.

According to another aspect of the present disclosure, a method for music score modification may include: determining, by a processor, a user performance level of a user and providing, by the processor, a modified music score for the user based on the user performance level. In some embodiments the user performance level is determined based on characteristics of the user's performance. In some embodiments, the characteristics of the user's performance may be determined based on statistics of the user's historical performance records. The method may further include displaying the modified music score by a display.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to some embodiments and applications without departing from the spirit and scope of the present disclosure. Thus, the present disclosure is not limited to the embodiments shown, but is to be accorded the widest scope consistent with the claims.

It will be understood that when a module or unit is referred to as being "on," "connected to," or "coupled to" another module or unit, it may be directly on, connected or coupled to the other module or unit or intervening module or unit may be present. In contrast, when a module or unit is referred to as being "directly on," "directly connected to" or "directly coupled to" another module or unit, there may be no intervening module or unit present. As used herein, the term "and/or" includes any and all combinations of one or more of the associated listed items.

The terminology used herein is for the purpose of describing particular example embodiments only and is not intended to be limiting. As used herein, the singular forms "a," "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
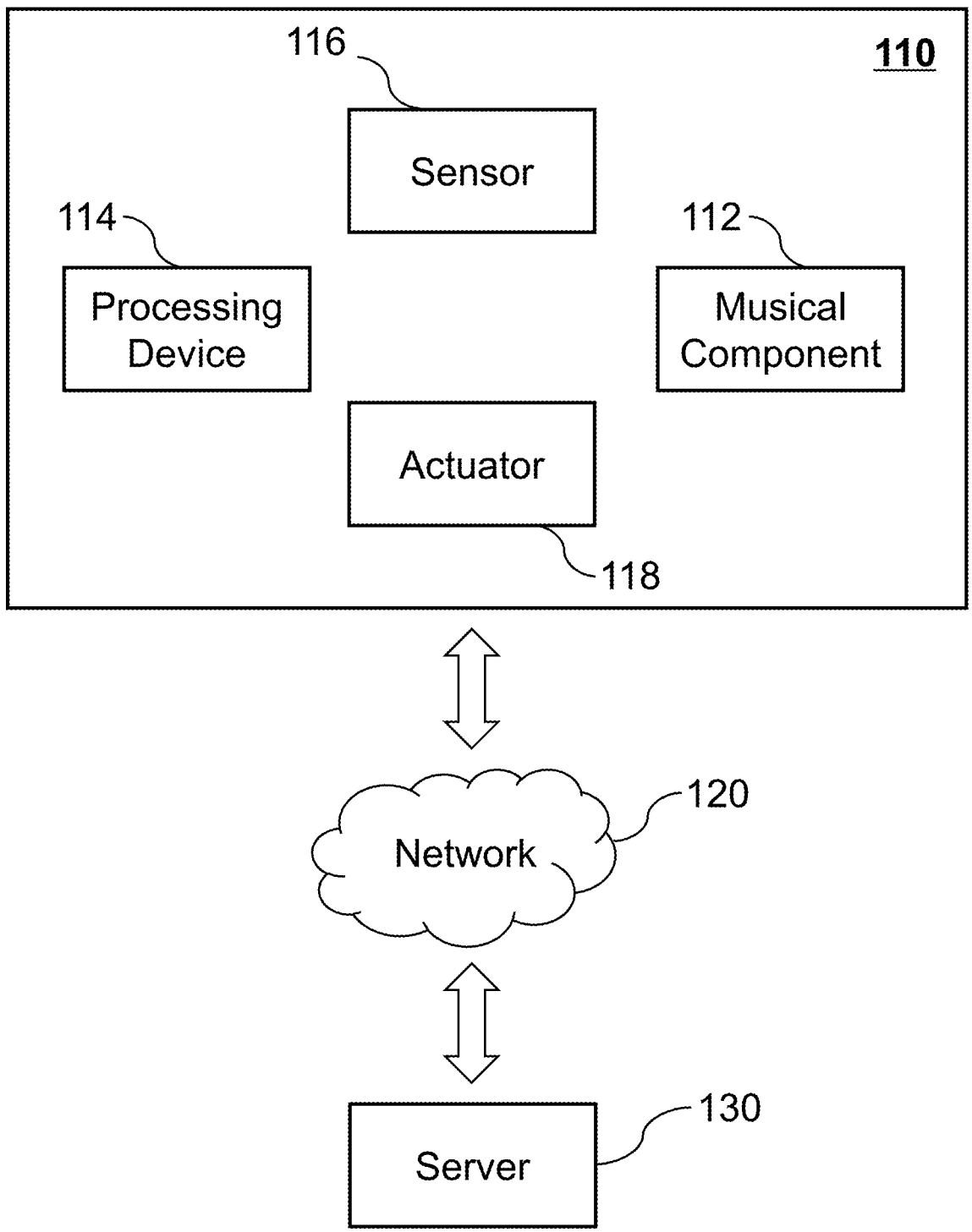
FIG. 1 is a schematic diagram illustrating an exemplary musical system according to some embodiments of the present disclosure.

FIG. 1 is a schematic diagram illustrating an exemplary musical system 100 according to some embodiments of the present disclosure. As shown in FIG. 1, the musical system 100 may include a musical engine 110, a network 120, and a server 130. In some embodiments, the musical engine 110 may include a musical component 112, a processing device 114, a sensor 116, and an actuator 118.

The musical component 112 may include a key-based musical instrument. The exemplary key-based musical instrument may include a piano (e.g., an acoustic piano), an organ (e.g., a pipe organ, a Hammond organ, etc.), an accordion, an electronic keyboard, a synthesizer, a MIDI keyboard, or the like, or a combination thereof. In some embodiments, the musical component 112 may include a part of a key-based musical instrument. Exemplary part of a key-based musical instrument may include a key of a piano (e.g., a white key or a black key), a hammer, a pedal, a protective case, a soundboard, a metal string, or the like, or a combination thereof. In some embodiments, the musical component 112 may be connected to or otherwise communicate with other devices of the musical engine 110 (e.g., the processing device 114, the sensor 116 and/or the actuator 118). In some embodiments, the musical component 112 may be integrated into any other device of the musical engine 110 (e.g., the processing device 114, the sensor 116, and/or the actuator 118).

The processing device 114 may be configured to process information or data generated by the musical component 112, the sensor 116 and/or the actuator 118. In some embodiments, the processing device 114 may include a computing device. The exemplary computing device may include a desktop, a laptop, a mobile phone, a tablet computer, a wearable computing device, or the like, or a combination thereof. In some embodiments, the processing device 114 or a part of the processing device 114 may be integrated into any other device of the musical engine 110 (e.g., the musical component 112, the sensor 116, or the actuator 118).

In some embodiments, the processing device 114 may include one or more processors to perform processing operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), or any circuit or processor capable of executing one or more functions, or the like, or any combinations thereof.

The sensor 116 may be configured to detect motion information of the musical component 112. In some embodiments, the sensor 116 may include a photoelectric sensor, an accelerometer, a magneto-electric sensor, a piezo-electric sensor, an angle sensor, or the like, or any combination thereof. Exemplary motion information may include velocity, angular velocity, acceleration, displacement, angle, momentum, impulse, kinetic energy, duration, or the like, or a combination thereof. Merely by way of example, the sensor 116 may detect motion information of a key of a piano. The motion information of a key may include a position of the key, timing information regarding motion of the key (e.g., a time point corresponding to depression of the key, a time point corresponding to release of the key, a time point corresponding to a specific position of the key, etc.), a depression strength, a velocity of the key during motion, or the like, or a combination thereof. In some embodiments, the sensor 116 may be further configured to generate a signal (also referred to as "key signal") including the detected motion information of the key. In some embodiments, the key signal may include an electrical current signal, a voltage signal, or the like, or a combination thereof.

In some embodiments, the musical engine 110 may include one or more sensors 116 configured to detect motion information about one or more keys, pedals, hammers, actuators, and/or any other component of the musical system. For example, sensors 116 may include multiple sensors configured to detect motion information about one or more keys of the musical system. In some embodiments, each of the sensors 116 may correspond to a key of the musical component 112. For example, a sensor 116 may detect motion of a key of the musical component 112 and record information about the motion. More particularly, for example, the sensor can generate a key signal based on the detected motion. In some embodiments, the key signal may be an electrical current signal, and the electrical current signal may correspond to a note of a music score played by a user. The keys signal may represent information about the detected motion.

The actuator 118 may be configured to generate one or more acoustic sounds by striking the musical component 112 (e.g., one or more keys of a piano). In some embodiments, the actuator 118 may strike the musical component 112 automatically based on a triggering event (e.g., a control signal generated by the processing device 114, or instructions from a user). For example, a motor may drive the actuator 118 based on a Pulse Width Modulation (PWM) mechanism. In some embodiments, the actuator 118 may strike the musical component 112 with a steady frequency.

The network 120 may be configured to facilitate communications between the musical engine 110 and the server 130. For example, the musical engine 110 may transmit data or information to the server 130 via the network 120. In some embodiments, the network 120 may include a wired network, a nanoscale network, a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The server 130 may be configured to process information or data relating to the musical engine 110. In some embodiments, the server 130 may be local or remote to the musical engine 110. In some embodiments, the server 130 may be centralized (e.g., a data center) or distributed. In some embodiments, the server 130 may include a library (not shown). The library may store information corresponding to different users. The library may include a plurality of sections classified according to time (e.g., this week, last week, or next week, or the like). In some embodiments, the server 130 may include a server or a group of servers. In some embodiments, the server 130 may include a file server, a database server, an FTP (File Transport Protocol) server, an application server, a proxy server, a mail server, a cloud server, or the like, or any combination thereof. In some embodiments, the server 130 may provide a cloud storage.

It should be noted that the above embodiments are provided for the purposes of illustration, and not intended to limit the scope of the present disclosure. After consulting the present disclosure, one skilled in the art may envisage numerous other changes, substitutions, variations, alterations, and modifications without inventive activity, and it is intended that the present disclosure encompasses all such changes, substitutions, variations, alterations, and modifications, as falling within its scope. For example, the server 130 may be unnecessary, and a local server may be integrated into the musical engine 110. As another example, the musical engine 110 may include a storage device, or the components in the musical engine 110 may include a storage device respectively.

Figure 2A:
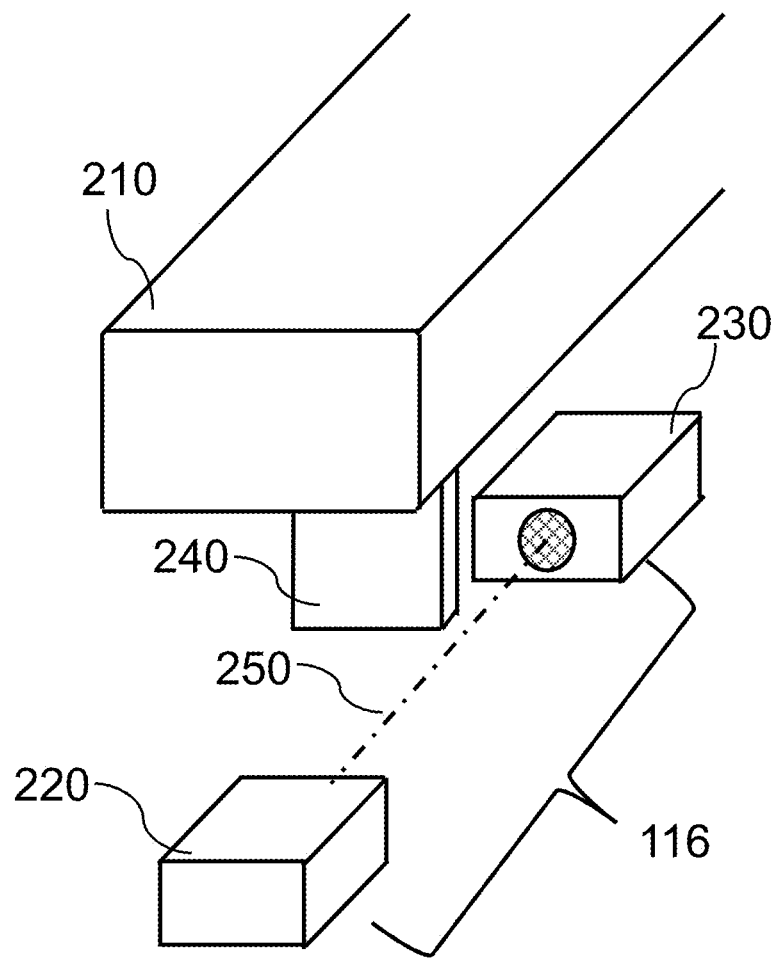
FIGS. 2A-2B are block diagrams illustrating exemplary sensors according to some embodiments of the present disclosure.
Figure 2B:
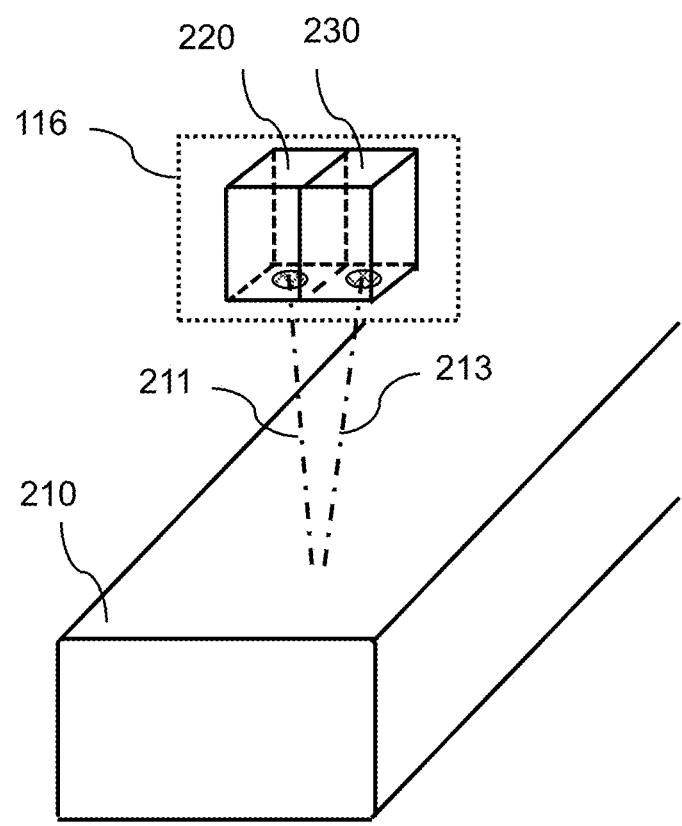

FIGS. 2A-2B are schematic diagrams illustrating exemplary sensors according to some embodiments of the present disclosure. In some embodiments, the sensors may be and/or include a photoelectric sensor. As illustrated in FIG. 2A, the sensor 116 may include a light-emitting element 220 and a light-detecting element 230. An exemplary list of the light-emitting element 220 may include visible LED, laser LED, infrared LED, laser diode (LD), photocell, etc. An exemplary list of the light-detecting element 230 may include phototube, active-pixel sensor (APS), bolometer, charge-coupled device (CCD), gaseous ionization detector, photoresistor, phototransistor, etc. The light-emitting element 220 may generate light of various wavelengths. For example, the light-emitting element 220 may generate visible light, infrared light, ultraviolet (UV) light, etc. In some embodiments, the wavelength of a beam of light emitted by the light-emitting element 220 may be controlled by one or more motors using a Pulse Width Modulation (PWM) mechanism. The light-detecting element 230 may be configured to receive the light and to convert it into an electronic signal (e.g., an electrical current signal, a voltage signal, etc.).

In some embodiments, as illustrated in FIG. 2A, the light-emitting element 220 and the light-detecting element 230 may be positioned under a key 210. In some embodiments, the key 210 may be coupled and/or connected with a non-transparent plate 240. The non-transparent plate 240 may partially or completely prevent the light-detecting element 230 from receiving the light emitted by the light-emitting element 220. The non-transparent plate 240 may be coupled to a surface of the key 210 (e.g., the bottom of the key 210). The light-emitting element 220 may constantly emit light towards the light-detecting element 230. The light-emitting element 220 may also discontinuously emit light towards the light-detecting element 230. For instance, there may be one or more time intervals between light emissions. The one or more time intervals may be based on the velocity of the player depressing the keys.

In some embodiments, a light beam 250 may be emitted by the light-emitting element 220. When the key 210 is not pressed down, the key stays at a "top" position, where the light-detecting element 230 may receive light emitted from the light-emitting element 220 without obstruction. Accordingly, the light-detecting element 230 may generate the strongest electronic signal. When a player presses the key 210, the key may move downwards from the "top" position.

As the key moves down, the non-transparent plate 240 may start to block portion of the light emitted from the light-emitting element 220. Accordingly, an amplitude of the electronic signal generated by the light-detecting element 230 may start to decrease. When the key 210 does not go further, it reaches an "end" position. The non-transparent plate 240 may move along with the key 210 and may further block one or more portions of the light beam 250 when the key is pressed down towards the "end" position, thereby the amplitude of the electronic signal generated by the light-detecting element 230 may be further reduced to a minimum value. The amount of the light detected by the light-detecting element 230 may vary due to the movement of the non-transparent plate 240. For example, when the key 210 moves toward the "end" position, the amount of light detected by the light-detecting element 230 may decrease. The faster the key is pressed down, the faster the decrease of the detected light, thereby the faster the decrease of the amplitude of the electrical signal. As another example, when the key 210 moves toward the "top" position, the amount of light detected by the light-detecting element 230 may increase. The faster the key moves upward, the faster the amplitude of electrical signal that the light-detecting element 230 detects may increase. The light-detecting element 230 may acquire information about the amount of the received light over time and may convert such information into one or more electronic signals (e.g., one or more key signals).

The light-emitting elements and the light-detecting elements described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure. For example, in some embodiments, the light-emitting element 220 and the light-detecting element 230 may be placed above or beneath the key 210, and the light beam 250 emitted by the light-emitting element 220 may be reflected by the key 210 once it reaches a surface of the key 210 and then travel towards the light-detecting element 230. In this example, the non-transparent plate 240 may be omitted from the musical system 100.

For example, as illustrated in FIG. 2B, the light-emitting element 220 and the light-detecting element 230 may be placed above or beneath the key 210. A light beam 211 emitted by the light-emitting element 220 may be projected towards the key 210. The light beam 511 may be reflected by the key 210 once it reaches a surface of the key 501 (e.g., the upper surface, the bottom surface, etc.). The reflected light 213 may then travel towards the light-detecting element 503 and may be received by the light-detecting element 230. When a player presses the key 210, the key may move downwards from the "top" position to the "end" position. The distance that the light travels from the light-emitting element 220 to the light-detecting element 230 may vary due to various motions of the key. The light-detecting element 230 may determine the time between light emission and light reception to record the change in distance that the light travels. The change in distance may be converted into one or more electric signals by the light-detecting element 230.

Figure 2C:
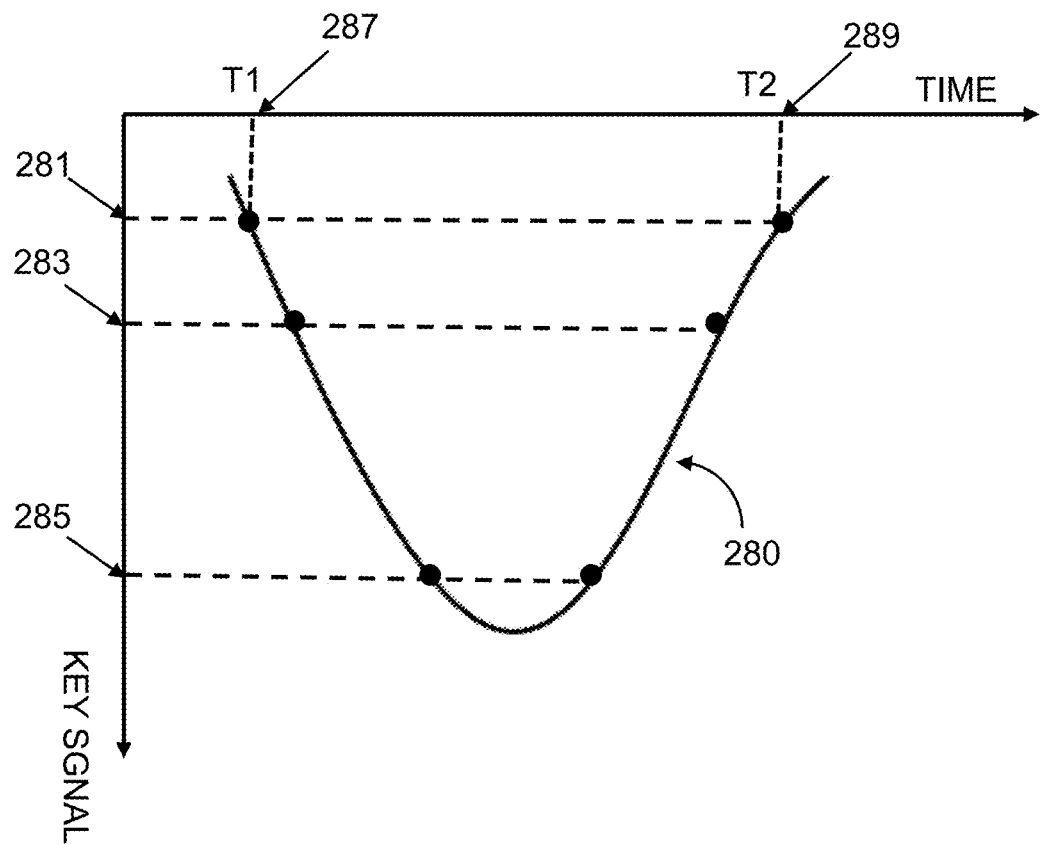
FIG. 2C illustrates an example of a key signal according to some embodiments of the present disclosure.

FIG. 2C illustrates an example 280 of a key signal according to some embodiments of the present disclosure. Key signal 280 can correspond to a trajectory of a key of a piano during a performance of a piece of music. Key signal 280 may be generated using one or more mechanisms described in conjunction with FIGS. 2A-2B above. The key may stay at a "top" position if no force is exerted on the key. When a player presses the key, the key may move downwards along with a finger of the player. When the key does not go further (e.g., when the player starts releasing the key), the key may reach an "end" position. After the key is released by the player, the key moves upwards to the "top" position. As such, the trajectory of the key may represent the key's movements from the "top" position to the "end" position and/or movements from the "end" position to the "top" position.

Key signal 280 may represent information about the motion of the key in the trajectory. For example, a value of the key signal (e.g., an amplitude of the key signal) may correspond to a particular position of the key (e.g., the "top" position, the "end" position, a position between the "top" position and the "end" position, and/or any other position). A time instant corresponding to the value of the key signal may indicate a time at which the key is located at the particular position. Various values of the key signal may correspond to different positions of the key in the trajectory. During the movement of the key from the "top" position to the "end" position, the values of the key signal may increase. Similarly, during the movement of the key from the "end" position to the "top" position, the values of the key signal may decrease.

In some embodiments, one or more reference values may be used to determine positions of the key during a performance. For example, as illustrated in FIG. 2C, reference values 281, 283, and 285 can correspond to a first position, a second position, and a third position of the key, respectively. In some embodiments, the first position may correspond to the "top" position. The third position may correspond to the "end" position. The third position may correspond to a position between the "top" position and the "end" position. Timing information related to the reference values 281, 283, and 285 (e.g., time instants 287 and 289 corresponding to reference value 281) may be used to determine the motion of the key. For example, time instant 287 may correspond to depression of the key. Time instant 289 may correspond release of the key. A time interval between time instant 287 and time instant 289 may represent a note duration produced by the key.

While three reference values are illustrated in FIG. 2C, this is merely illustrative. Any suitable number of reference values can be used to determine positional information of the key. For example, four reference numbers corresponding to four positions may be used in some embodiments.

Figure 3:
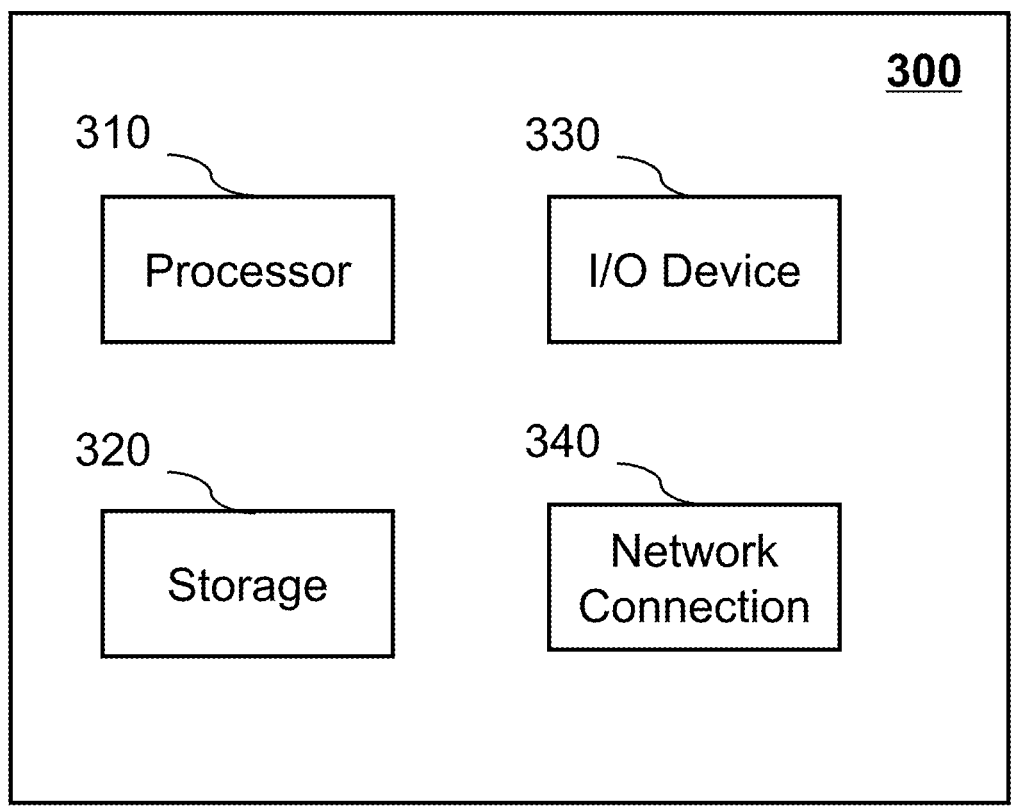
FIG. 3 is a schematic diagram illustrating hardware and software components of an exemplary processing device according to some embodiments of the present disclosure.

FIG. 3 is a schematic diagram illustrating an example 300 of a computing device according to some embodiments of the present disclosure. In some embodiments, each of music engine 110, musical component 112, processing device 114, server 130, and/or any other component of musical system 100 can be implemented using one or more computing devices 300 and/or one or more portions of a computing device 300.

As shown in FIG. 3, computing device 300 may include a processor 310, a storage 320, an I/O device 330, and a network connection 340.

The processor 310 may execute computer instructions (e.g., program code) stored in the storage 320 and perform functions in accordance with techniques described herein. Computer instructions may include routines, programs, objects, components, data structures, procedures, modules, and functions, which perform particular functions described herein. The processor 310 may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an acorn reduced instruction set computing (RISC) machine (ARM), or any other suitable circuit or processor capable of executing computer program instructions, or the like, or any combination thereof.

The storage 320 may be configured to store information or data from the musical component 112, the sensor 116, the actuator 118, or the like. In some embodiments, the storage 320 may be configured to store information or data generated by the processing device 114. The information or data may include a music score, user information, auto-play information, or the like, or a combination thereof. In some embodiments, the storage 320 may be configured to store one or more computer programs to be executed by the processor 310 to perform exemplary methods described in this disclosure. For example, the storage 320 may be configured to store program(s) and/or instructions executed by the processor 310 to analyze or process music scores or user information. In some embodiments, the storage 320 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The I/O device 330 may be configured to input or output signals, data, or information. In some embodiments, the I/O device 330 may enable a user interaction with the processing device 114. In some embodiments, the I/O device 330 may include an input device and an output device. The exemplary input device may include a keyboard, a mouse, a touch screen, a microphone, or the like, or a combination thereof. The exemplary output device may include a display device, a loudspeaker, a printer, a projector, or the like, or a combination thereof. The exemplary display device may include a liquid crystal display (LCD), a light-emitting diode (LED)-based display, a flat panel display, a curved screen, a television device, a cathode ray tube (CRT), or the like, or a combination thereof. In some embodiments, the I/O device 330 include a synthesizer, a sequencer, an audio codec, a signal processor, or the like, or a combination thereof. For example, the I/O device 330 may generate and output a sound. The sound may include an electric sound or an acoustic sound.

The network connection 340 may be configured to connect the processing device 114 with any other component of the musical system 100. The network connection 340 may include a wired connection or a wireless connection. The wired connection may include a metal cable, an optical cable, a hybrid cable, an interface, or the like, or any combination thereof. The wireless connection may include a wireless local area network (WLAN), a Local Area Network (LAN), a Wide Area Network (WAN), a Bluetooth, a Zig-Bee, a Near Field Communication (NFC), or the like, or any combination thereof.

The processing device 114 described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure. For example, the storage 320 may be unnecessary and an external storage (e.g., a cloud storage) may be used.

Figure 4:
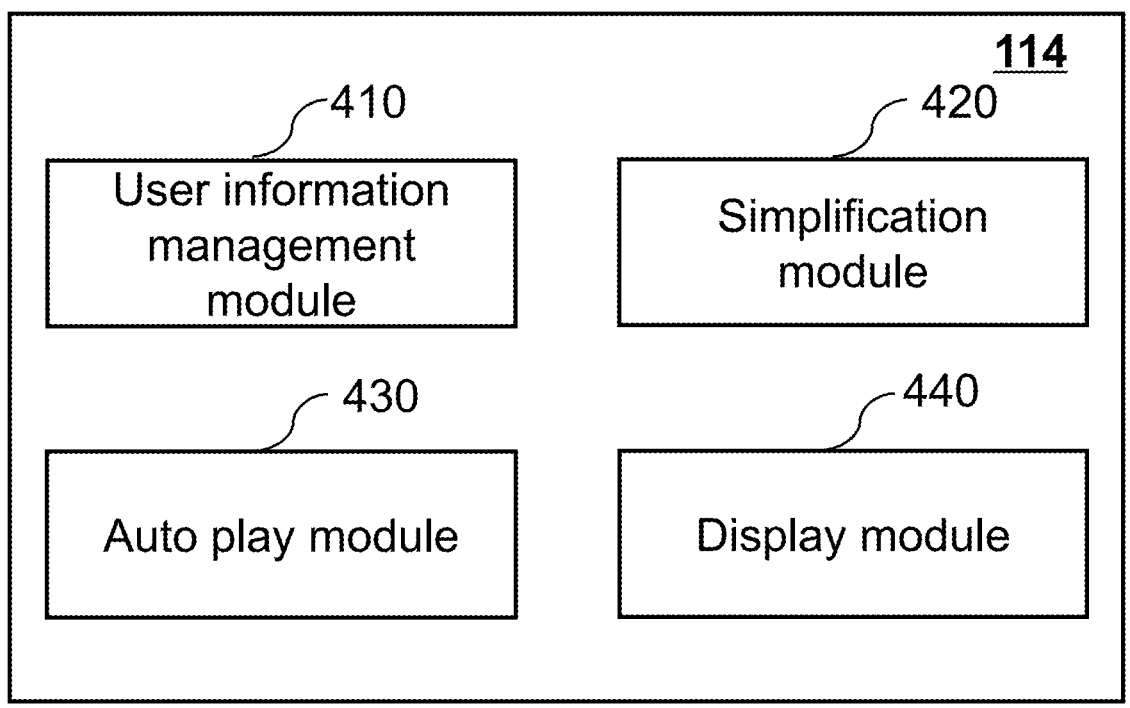
FIG. 4 is a block diagram illustrating an exemplary processing device according to some embodiments of the present disclosure.

FIG. 4 is a block diagram illustrating an exemplary processing device 114 according to some embodiments of the present disclosure. In FIG. 4, the processing device 114 is introduced and understood based on its logical functions and circuitry. The processing device 114 may include a user information management module 410, a simplification module 420, an auto play module 430, and a display module 440.

The user information management module 410 may be configured to manage user information. The user information may include user account information, statistical information, user performance level (e.g., a beginning learner, an intermediate, an advanced player, an expert, or the like), or the like, or a combination thereof. As used herein, the user account information may include basic information (e.g., name, age, gender, or the like), user login information, user settings, or the like, or a combination thereof. The statistical information may include the number of notes, the number of chords, a type of tone, an accuracy rate, error information, or the like, or a combination thereof. The error information may include one or more notes played incorrectly during one or more performances, notes that are played too fast or too slowly, types of rhythms played incorrectly, types of chords played incorrectly, an incorrect time point relating to a depression of a key, an incorrect time point relating to a release of the key, an incorrect strength applied to the key, an incorrect note duration, an error rate, wrong signal detected during performance, or the like, or a combination thereof. The accuracy rate may refer to a ratio of the number of notes that are played correctly to the total number of notes need to be played. In some embodiments, a music score may be divided into one or more music units according to a library in a database (e.g. the server 130). The music units may include a note, a chord, a rest, or the like, or a combination thereof. Exemplary notes may include a whole note, a crotchet, a quaver, a minim, or the like, or a combination thereof. Exemplary chords may include a triad, a seventh chord, or the like, or a combination thereof. Exemplary rests may include a whole rest, a minim rest, a crotchet rest, or the like, or a combination thereof. The music unit may include one or more music elements. For example, a music element may be a note. As such, a triad may include three music elements. The user information management module 410 may be configured to determine an error rate related to one or more performances of a music score (e.g., one or more historical performances). For example, an error rate can be determined for a performance of the music score based on a ratio of the number of music unit(s) incorrectly played to all the music units in the music score played by a user. As another example, for multiple performances of the music score, an error rate may be defined as a ratio of the number of a specific music unit played incorrectly in the multiple performances to the total number of the specific music unit played in the multiple performances.

In some embodiments, the user information management module 410 may obtain the user information by analyzing a performance of a music score. In some embodiments, the user information management module 410 may acquire the user information from the server 130. In some embodiments, the user information management module 410 may update the user information in real time or at a certain time interval.

The simplification module 420 may be configured to generate one or more music scores and/or any other information based on the user information and/or any other information about one or more performances and/or users. For example, the simplification module 420 can modify (e.g., simplify) a music score based on the user information related to one or more historical performances of a music score and can generate one or more modified music scores (e.g., simplified music scores). In some embodiments, a simplified music score may refer to a modified music score with a lower difficulty level. For example, a simplified music score may include a music score with a slower tempo, a music score with fewer notes, a music score with notification information (e.g., a notification regarding a next note to be played), or the like, or a combination thereof. In some embodiments, the simplification module 420 may simplify a music score based on the user information (e.g., user performance level, statistical information for the user's performance, or the like). In some embodiments, the simplification module 420 may generate multiple simplified music scores with different difficulties. For example, the simplification module 420 may generate a first-level simplified music, a second-level simplified music, a third-level simplified music, or the like, or a combination thereof. As used herein, the first-level, the second-level and the third-level may refer to levels with different difficulties.

In some embodiments, the simplification module 420 may be further configured to acquire a simplified music score based on the user information from any storage device disclosed elsewhere in the present disclosure. For example, if the user information indicates that the user may be a beginning learner, the simplification module 420 may select a music score with a low difficulty for the user. As another example, the simplification module 420 may select a cheerful music score for a child and a peaceful music score for an old man. As a further example, the simplification module 420 may select a simplified music score for a user based on the statistical information. In some embodiments, a user may select the simplified music score manually. In some embodiments, when the user selects the simplified music score, the simplification module 420 may provide a notification. For example, if a beginning learner selects a simplified music score with a high difficulty level, the simplification module 420 may provide a notification that the selected simplified music score may be difficult for the user.

The auto play module 430 may be configured to generate a sound automatically or semi-automatically. The sound may include an electric sound, an acoustic sound, or the like, or a combination thereof. In some embodiments, the auto play module 430 may play a music score automatically or semi-automatically based on the user information and/or the simplified music score. In some embodiments, the auto play module 430 may be triggered by a triggering event (e.g., instructions from a user, statistical information, or the like). For example, if the statistical information indicates that a plurality of errors frequently occurred during historical performances of a music score by a user (e.g., the probability of error is higher than a threshold value when the user plays the score), the auto play module 430 may be triggered. As another example, the auto play module 430 may be triggered when a particular error rate is detected in connection with one or more historical performances. More particularly, for example, the particular error rate may be an error rate that is greater than or equal to a threshold of error rate.

The display module 440 may be configured to display the user information (e.g., user performance level, statistical information, or the like), the simplified music score, auto play information, or the like, or a combination thereof. In some embodiments, the display module 440 may be implemented via the I/O device 330. In some embodiments, the display module 440 may include a user interface which may enable interactions between a user and the musical system 100.

The processing device 114 described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure. For example, any two modules may be combined into a single module, or any one module may be divided into two or more modules. In some embodiments, one or more modules may be implemented via a computing device (e.g., a desktop, a laptop, a mobile phone, a tablet computer, a wearable computing device, etc.).

Figure 5:
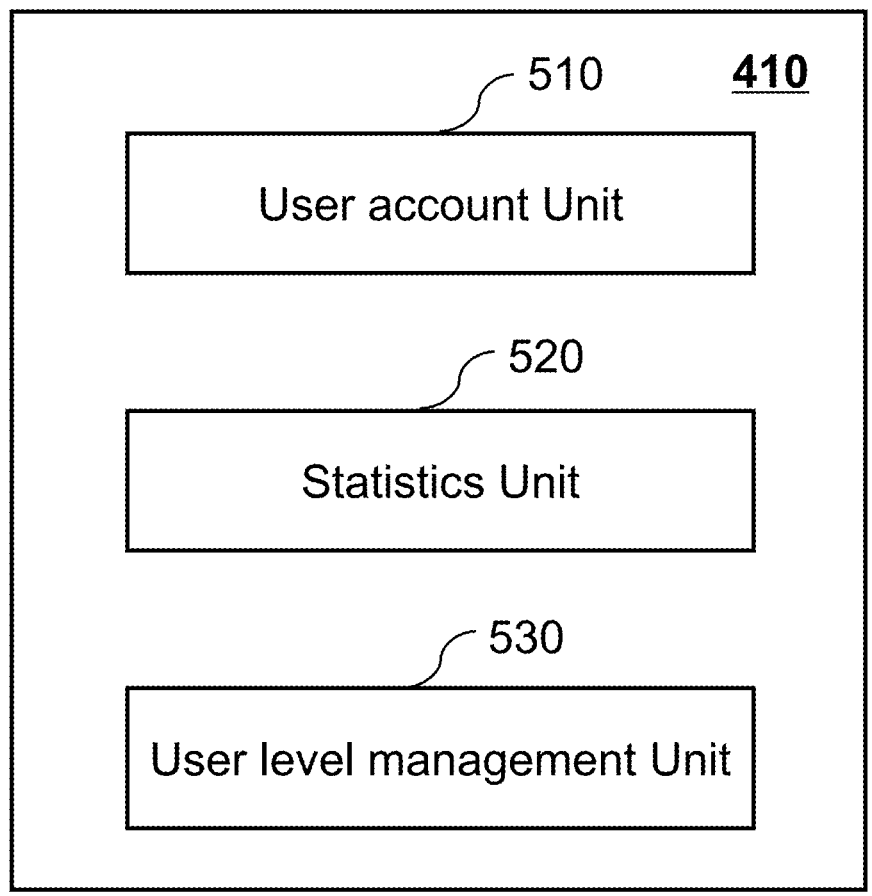
FIG. 5 is a block diagram illustrating an exemplary user information management module according to some embodiments of the present disclosure.

FIG. 5 is a block diagram illustrating an exemplary user information management module 410 according to some embodiments of the present disclosure. The user information management module 410 may include a user account unit 510, a statistics unit 520, and a user performance level management unit 530.

The user account unit 510 may be configured to access or manage user account information of a user. In some embodiments, the user account information may include basic information of a user (e.g., name, age, gender, or the like), user login information, user settings, or the like, or a combination thereof. The user login information may include a user name, a nickname, an email address, a QR (quick response) code, or the like, or a combination thereof. In some embodiments, a user or an operator other than the user may access the user account unit 510 via a password or an authentication. In some embodiments, the user login information may be stored in any storage disclosed elsewhere in the present disclosure. In some embodiments, the user login information may be shared via a social network platform such as WeChat™, Weibo™, QQ™, Facebook™, or the like, or a combination thereof.

The statistics unit 520 may be configured to summarize the user's historical performances of a music score, and/or generate statistical information of the user's performances. The statistical information may include the number of notes, the number of chords, a type of tone, an accuracy rate, error information (e.g., one or more error rates), or the like, or a combination thereof.

In some embodiments, the statistics unit 520 may generate a statistical report including the statistical information and/or other user information (e.g., basic information). In some embodiments, the statistics unit 520 may summarize the performance of the music score based on an algorithm. Exemplary algorithm may include a collaborative filtering (CF), a Cosine Similarity, a Euclidean-distance, or the like, or a combination thereof.

The user performance level management unit 530 may be configured to determine a user performance level. The user performance level may include beginning learner, intermediate, advanced player, expert, or the like, or a combination thereof. In some embodiments, the user performance level management unit 530 may determine the user performance level based on the user account information, and/or the statistical information. For example, the user performance level management unit 530 may compare the user's performance of a specific music score with other users' performances of the specific music score. The user performance level management unit 530 may rank the performances and generate a ranking result based on error rates of the performances. The user performance level management unit 530 may determine the user performance level based on the ranking result. For example, if the ranking result indicates that the user is within the top 10%, the user performance level management unit 530 may determine that the user may be an advanced player. In some embodiments, while determining the user performance level, the user performance level management unit 530 may take the type and/or difficulty of the music score into consideration. In some embodiments, the user performance level management unit 530 may update a user performance level in real time or at a certain time interval (e.g., per day, per week, per month, or the like). For example, the user performance level management unit 530 may update the user performance level immediately after a music score is performed. As another example, the user performance level management unit 530 may update the user performance level based on instructions from a user.

The user information management module 410 described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure. For example, any two modules may be combined into a single module, or any one module may be divided into two or more modules. In some embodiments, one or more modules may be implemented via a computing device (e.g., a desktop, a laptop, a mobile phone, a tablet computer, a wearable computing device, etc.).

Figure 6:
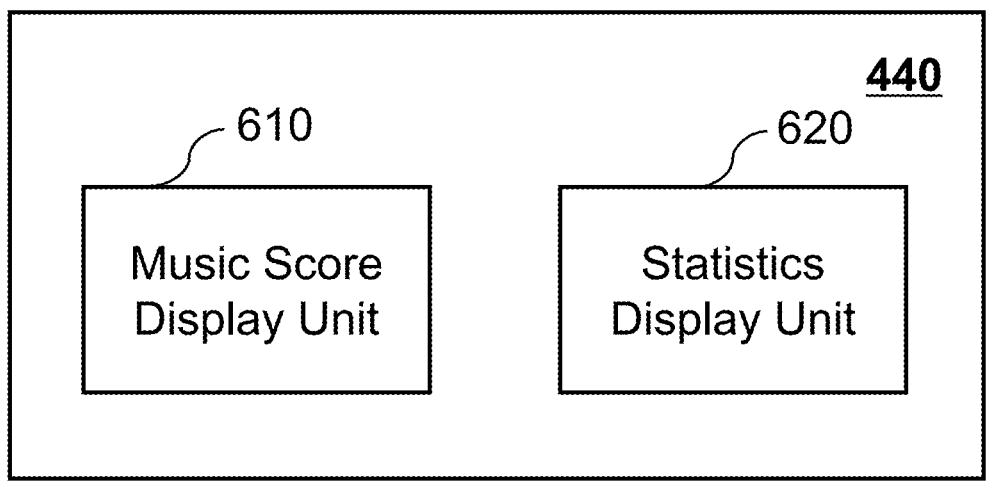
FIG. 6 is a block diagram illustrating an exemplary display module according to some embodiments of the present disclosure.

FIG. 6 is a block diagram illustrating an exemplary display module 440 according to some embodiments of the present disclosure. The display module 440 may include a music score display unit 610, and a statistics display unit 620.

The music score display unit 610 may be configured to display a music score. The music score may include an original music score or a simplified music score. As used herein, an original music score may refer to a music score that is not modified. A simplified music score may refer to a modified music score with portions of the original music score and/or a lower play difficulty. In some embodiments, the music score display unit 610 may display the music score in various forms including text, picture, video, audio, or the like, or a combination thereof.

For example, the music score display unit 610 may display notes played by left hand and notes played by right hand separately. As another example, the music score display unit 610 may display the notes played by left hand and the notes played by right hand in different colors. As a further example, the music score display unit 610 may highlight next notes to be played. As a still further example, the music score display unit 610 may display the simplified music score in a manner of numbered musical notation. As a still further example, the music score display unit 610 may display chords of the music score in a form of text information.

In some embodiments, the music score display unit 610 may display the music score in a form of virtual key (e.g., a virtual keyboard). As used herein, a virtual key may correspond to an actual key in the musical component 112 (e.g., a keyboard). In some embodiments, the music score display unit 610 may display information relating to the actual key on the virtual keyboard, for example, timing information relating to depression and/or release of the actual key, a strength to be applied to the actual key, a note duration, or the like, or a combination thereof. In some embodiments, the music score display unit 610 may use a key indicator to indicate next notes to be played.

The statistics display unit 620 may be configured to display statistical information of a performance of a music score. The statistical information may include the number of notes, the number of chords, type of tone, correction rate, error information, error rate, or the like, or a combination thereof. The error information may include notes played incorrectly, notes played too fast or too slowly, types of rhythms played incorrectly, types of chords played incorrectly, an incorrect time point relating to a depression of a key, an incorrect time point relating to a release of the key, an incorrect strength applied to the key, an incorrect note duration, or the like, or a combination thereof. In some embodiments, the statistics display unit 620 may mark the error information in different colors. For example, the statistics display unit 620 may mark the notes played incorrectly with a red circle. In some embodiments, the statistics display unit 620 may display a statistical report generated by the statistics unit 520.

In some embodiments, the statistics display unit 620 may display the statistical information in a form of virtual key. As mentioned above, a virtual key may correspond to an actual key in the musical component 112 (e.g., a keyboard). In some embodiments, the statistics display unit 620 may use a key indicator to remind the error information. For example, the statistics display unit 620 may mark one or more virtual keys corresponding to the notes played incorrectly with a different color (e.g., red color). As another example, the statistics display unit 620 may blink the one or more virtual keys corresponding to the notes played incorrectly.

The display module 440 described above are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure. For example, any two units may be combined into a single unit, or any one unit may be divided into two or more units. As another example, the display module 440 may further include a display unit used to display the user account information.

Figure 7:
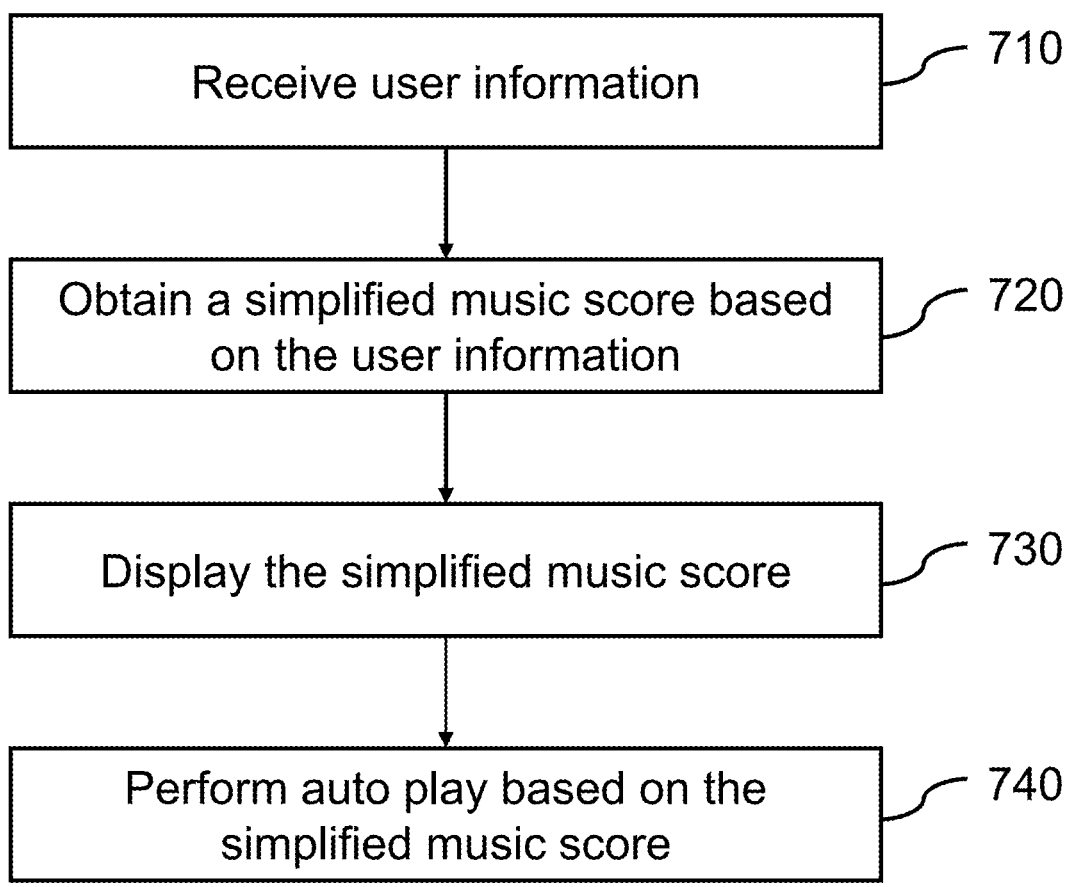
FIG. 7 is a flowchart illustrating an exemplary process for simplifying a music score according to some embodiments of the present disclosure.

FIG. 7 is a flowchart illustrating an exemplary method and/or process for simplifying a music score according to some embodiments of the present disclosure. The process and/or method may be executed by the musical system 110. For example, the process and/or method may be implemented as a set of instructions stored in the storage 320. The processor 310 may execute the set of instructions and may accordingly be directed to perform the process and/or method.

In step 710, user information management module 410 may receive user information. The user information may include user account information, statistical information (e.g., information about the user's historical performances), user performance level (e.g., a beginning learner, an intermediate, an advanced player, an expert, or the like), or the like, or a combination thereof. The information about the user's historical performances may include, for example, an error rate of a specific note in a music score played by the user, or the like. For example, the above user information may be associated with a user account stored in a remote database in communication with the server 130, and/or may be stored in a local database in communication with the processing device 114. When a user access the musical system 110 through his/her account, such as when the user starts to practice on the musical component 112 or when the user logs in the processing device 114 or the server 130, the user information management module 410 may obtain the user information from the local database or from the remote database through the network 120 and the server 130.

In step 720, the simplification module 420 may obtain a simplified music score based on the user information. In some embodiments, the simplification module 420 may generate the simplified music score based on the user information. For example, the simplification module 420 may analyze the user's historical performances and extract statistical data and/or information about characteristics (e.g., the user's habitual performance) of the user's performance. In some embodiments, the simplification module 420 may remove one or more portions of the music score and keep one or more other portions of the music score based on the characteristics of the user's performance. For example, if the statistical data and/or information indicates that a first portion of the music score (e.g., a specific chord) is often played incorrectly (e.g., an error rate higher than a threshold), the simplification module 420 may generate a modified music score (e.g., a simplified music score) by removing the first portion (e.g., the chord) from the music score. In some embodiments, the simplification module 420 may generate a modified music score by keeping a second portion of the music score (e.g., a portion of the music score corresponding to the main theme) and remove one or more other portions of the music score. In some embodiments, the simplification module 420 may acquire the simplified music score from any storage device disclosed elsewhere in the present disclosure based on the user information. For example, when the user is a child, the simplification module 420 may select a cheerful music score suitable for a child at the user's age and/or performance level; when the user is an old man, the simplification module 420 may select a peaceful music score suitable for an old man at the user's age and/or performance level. In some embodiments, while selecting the simplified music score, the simplification module 420 may take the type and/or difficulty of the music score into consideration. For example, if the user performance level indicates that the user may be a beginning learner, the simplification module 420 may select a simplified music score with a lower difficulty. In some embodiments, the simplification module 420 may generate the simplified music score based on difficulty of the original music score. The difficulty of the original music score may reflect how challenge to perform the music score. For example, the difficulty of the original music score may include the number of keys depressed in a chord, distance between any two keys depressed by one hand, distance between keys corresponding to neighboring notes, time intervals between performances of neighboring notes, or the like, or a combination thereof. For example, for a difficult original music score, the simplification module 420 may generate a plurality of simplified music scores with different simplification manners (e.g., text, picture, or the like).

In step 730, the display module 440 may display the simplified music score. In some embodiments, the display module 440 may display the simplified music score to the user as a numbered musical notation, a music score with one or more key indicators (e.g., highlighting a corresponding key on a virtual keyboard), and/or a music score with a plurality of virtual keys. For example, notes being played may be highlighted, and chords may be presented in a form of text, picture, video, audio, or the like, or a combination thereof.

In step 740, the auto play module 430 may perform an auto play based on the simplified music score. For example, if in the simplified music score, one or more chords are simplified, the auto play module 430 may compensate the chords. In some embodiments, a sound device (not shown) or the actuator 118 may perform the auto play. The sound device may include a synthesizer, a sequencer, an audio codec, a signal processor, a speaker, or the like, or a combination thereof). In some embodiments, the actuator 118 may automatically generate acoustic sounds by striking one or more keys. In some embodiments, the auto play module 430 may be integrated in the actuator 118.

It should be noted that the above embodiments are provided for the purposes of illustration, and not intended to limit the scope of the present disclosure. After consulting the present disclosure, one skilled in the art may envisage numerous other changes, substitutions, variations, alterations, and modifications without inventive activity, and it is intended that the present disclosure encompasses all such changes, substitutions, variations, alterations, and modifications, as falling within its scope.

Figure 8A:
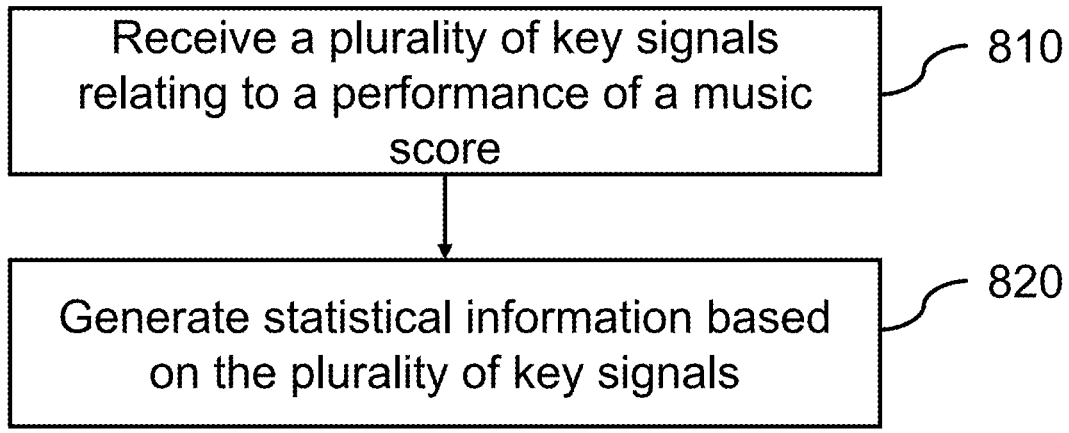
FIG. 8A is a flowchart illustrating an exemplary process for generating statistical information according to some embodiments of the present disclosure.

FIG. 8A is a flowchart illustrating an exemplary method and/or process for generating statistical information according to some embodiments of the present disclosure. The process and/or method may be executed by the musical system 110. For example, the process and/or method may be implemented as a set of instructions stored in the storage 320. The processor 310 may execute the set of instructions and may accordingly be directed to perform the process and/or method.

In step S10, the statistics unit 520 may receive a plurality of key signals relating to a performance of a music score. The plurality of key signals may include an electric signal, such as an electrical current signal, a voltage signal, etc. In some embodiments, the plurality of key signals may be generated by the sensors 116 based on motion information of the musical component 112 (e.g., keys of a piano). For example, the musical component 112 may include a plurality of keys of a piano. Each key of the plurality of keys may be connected with a sensor 116. When a user plays the music score, the user may press the plurality of keys along a predefined order and under a predefined manner (e.g., the plurality of keys is pressed under certain predefined force, speed, rhythm etc.). Accordingly, the motion information of each of the plurality of keys may include a position of the key, timing information regarding motion of the key (e.g., a time point corresponding to depression of the key, a time point corresponding to release of the key, a time point corresponding to a specific position of the key, etc.), a depression strength, a velocity of the key during motion, or the like, or a combination thereof.

In the step 820, the statistics unit 520 may generate statistical information based on the plurality of key signals. Algorithms used by the statistics unit 520 may include a collaborative filtering (CF), a Cosine Similarity, a Euclidean-distance, or the like, or a combination thereof. The statistical information may be data that statistically reflects style or characteristics of the user's performances. For example, the statistical information may include the number of notes, the number of chords, type of tone, or the user's correction rate, error information, error rate, or the like, or a combination thereof. The error information may include notes played incorrectly, notes played too fast or too slowly, types of rhythms played incorrectly, types of chords played incorrectly, an incorrect time point relating to a depression of a key, an incorrect time point relating to a release of the key, an incorrect strength applied to the key, an incorrect note duration, or the like, or a combination thereof.

In some embodiments, the statistics unit 520 may analyze the plurality of key signals acquired by the sensors 116, compare the plurality of key signals with a plurality of reference signals corresponding to a reference music score, and generate statistical data/information based on the comparison. Merely by way of example, a music score may include a certain number of notes (e.g., a first number of notes, such as n notes). The notes may correspond to a number of keys of a piano (e.g., a second number of keys, such as m keys). The first number may or may not be the same as the second number. In some embodiments, the first number may be greater than or equal to the second number. For example, the n notes may correspond to m key signals acquired by the sensors 116 installed under the keys illustrated in FIG. 2. Merely for illustration, FIG. 8C shows an example music score 802 that includes 7 notes, i.e., $N_1$, $N_2$, $N_3$, $N_4$, $N_5$, $N_6$ and $N_7$, wherein the 7 notes may correspond to 7 white keys of a piano including $K_1$, $K_2$, $K_3$, $K_4$, $K_5$, $K_6$ and $K_7$. The system in the present disclosure may store a "standard" way to play the music score as reference (herein defined as a "reference music score"). For example, when a user plays the music score, the user should press the keys in a predefined order (e.g., from $K_1$ to $K_7$). The sensors corresponding the 7 keys may detect 7 key signals (e.g., $S_1$, $S_2$, $S_3$, $S_4$, $S_5$, $S_6$ and $S_7$) in the predefined order. The 7 key signals corresponding to the reference music score may be referred to as the reference signals. For brevity, and without considering the way (e.g., speed, force, distance, and timing) that a key is pressed down, if a sensor acquires a key signal, the acquired key signal may be defined as signal "1". If the sensor fails to acquire a key signal, the acquired key signal may be defined as signal "0." Therefore the 7 reference signals may be expressed as {1, 1, 1, 1, 1, 1, 1}. If the user does not play the music score in the "standard" way (e.g., pressing the keys in a wrong order, missing one or more keys, pressing the keys with a slower tempo, etc.), the statistics unit 520 may compare the acquired key signals with the reference signals {1, 1, 1, 1, 1, 1, 1}, and generate statistical data/information indicative of an occurrence of an error. For example, if the acquired key signals were {1, 0, 1, 1, 1, 1, 1}, the statistics unit 520 may determine that the note $N_2$ was played incorrectly. The statistics unit 520 may collect historical performance of this music score by the user and determine an error rate of the music score (e.g., 1/7). As another example, if the user played the music score a certain number of times (each may be referred to as a "historical performance"), for example, 5 times, the acquired key signals may be expressed as below:
{1, 0, 1, 1, 1, 0, 1},
{1, 0, 1, 1, 1, 1, 1},
{1, 0, 1, 1, 1, 1, 1}
{1, 0, 1, 1, 1, 1, 1}
{1, 1, 1, 1, 1, 0, 1}
The statistics unit 520 may compare the acquired key signals with the reference signals {1, 1, 1, 1, 1, 1, 1}. The statistics unit 520 may determine that the error rate of the note $N_2$ is 80% and that the error rate of the note $N_6$ is 20% based on the comparison.

In some embodiments, the reference music score may be divided into a plurality of music units (e.g., a note, a chord, a rest, or the like) according to a library of music units in a database (e.g. the server 130). Each of the plurality of music units may correspond to one or more reference signals. For example, a note in the reference music may correspond to a reference signal, and a triad including three notes may correspond to three reference signals. In some embodiments, the statistics unit 520 may compare the plurality of key signals associated with a performance of a music score by the user with the plurality of reference signals according to the music units. In some embodiments, the statistics unit 520 may determine an accuracy rate and/or an error rate related to the music units in the music score played by the user. For example, the statistics unit 520 may determine an error rate of a chord in the music score played by the user. In some embodiments, the simplification module 420 may determine a user performance level based on the statistical information, and/or generate a simplified music score based on the user performance level. In some embodiments, the simplification module 420 may generate a modified music score based on the statistical information. For example, if the statistical information indicates that the error rate of a note is higher than a predefined threshold (e.g., 50%), the simplification module 420 may generate a modified music score (e.g., by removing the note from the music score and keeping the remaining portions of the music score). In some embodiments, the removed note may be played using the actuator 118.

In some embodiments, the statistic unit 520 can generate statistic information based on tempo information about the music score (e.g., one or more time signatures of the music score). For example, the statistics unit 520 may compare the plurality of key signals with the reference signals in time domain. One or more parameters of a reference signal may represent one or more characteristics of a specific note in the reference music score. For example, an amplitude of the reference signal (e.g., 1 or 0) may indicate whether the reference note is to be played and/or a dynamic related to the reference note (e.g., p, pp, f, ff, fff, etc.). As another example, a time point related to the reference signal may indicate a time at which the note is to be played. More particularly, for example, a time point of a first note in the reference music score may be defined as 0. Time points of the following notes may be expressed as $t_1$, $t_2$, ..., according to the characteristics of the music score. Exemplary characteristics may include rest information of the music score, tempo information of the music score (e.g., ¼, ⅛, or any other time signature), or the like, or a combination thereof. In some embodiments, the statistics unit 520 can compare a key signal acquired by the sensor 116 and a corresponding reference signal (e.g., by comparing the amplitudes and/or time information of the two signals) and determine whether a music unit corresponding to the acquired signal was correctly played based on the comparison. For example, in response to determining that the acquired signal is the same as the reference signal, the statistics unit 520 may determine that the music unit corresponding to the acquired key signal was correctly played. In some embodiments, the acquired signal may be regarded as being the same as the reference signal when a difference between the acquired signal and the reference signal does not exceed a threshold.

Figure 8B:
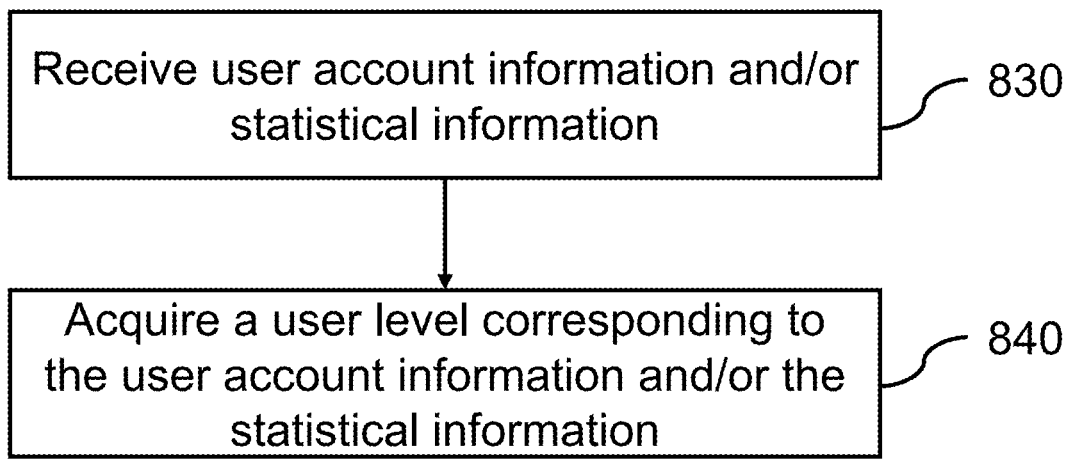
FIG. 8B is a flowchart illustrating an exemplary process for acquiring a user performance level according to some embodiments of the present disclosure.
Figure 8C:
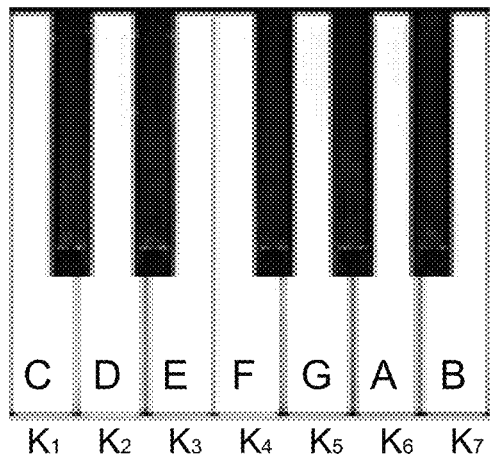
FIG. 8C is a schematic diagram illustrating exemplary notes and keys according to some embodiments of the present disclosure.
Figure 8C:
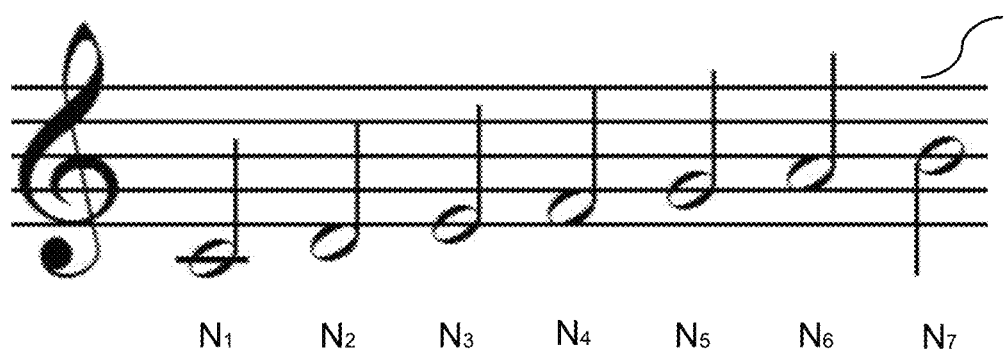

FIG. 8B is a flowchart illustrating an exemplary method and/or process for acquiring a user performance level according to some embodiments of the present disclosure. The process and/or method may be executed by the musical system 110. For example, the process and/or method may be implemented as a set of instructions stored in the storage 320. The processor 310 may execute the set of instructions and may accordingly be directed to perform the process and/or method.

In step 830, the user performance level management unit 530 may receive user account information from the user account unit 510, and/or statistical information from the statistics unit 520. The user account information may include basic information (e.g., name, age, gender, or the like), user login information, user settings, or the like, or a combination thereof. The statistical information may include the number of notes, the number of chords, type of tone, correction rate, error information, error rate, or the like, or a combination thereof.

In step 840, the user performance level management unit 530 may acquire a user performance level based on the user account information and/or the statistical information. For example, the user performance level management unit 530 may determine several user performance levels (e.g., first-level, second-level, or the like.) based on statistical information of a history performance.

It should be noted that the above embodiments are provided for the purposes of illustration, and not intended to limit the scope of the present disclosure. After consulting the present disclosure, one skilled in the art may envisage numerous other changes, substitutions, variations, alterations, and modifications without inventive activity, and it is intended that the present disclosure encompasses all such changes, substitutions, variations, alterations, and modifications, as falling within its scope. For example, other than the statistical information and the user performance level illustrated in FIG. 8A and FIG. 8B, some other user information including basic information (e.g., name, age, gender, or the like), user preference, or the like may be acquired.

Figure 9A:
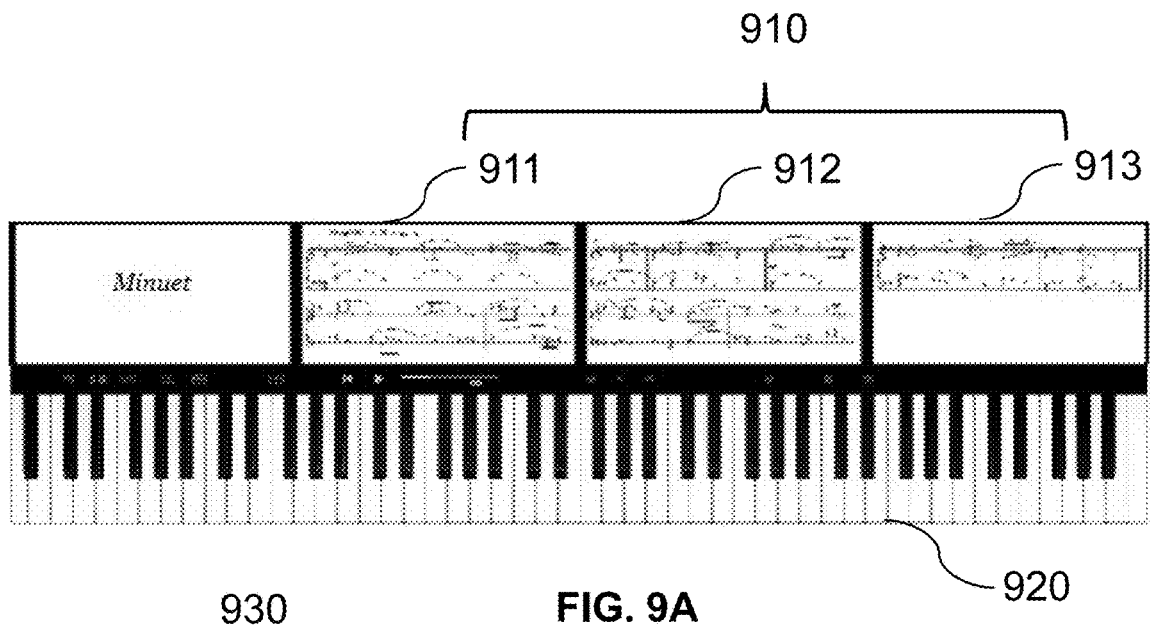
FIG. 9A is a schematic diagram illustrating an exemplary display manner according to some embodiments of the present disclosure.
Figure 9B:
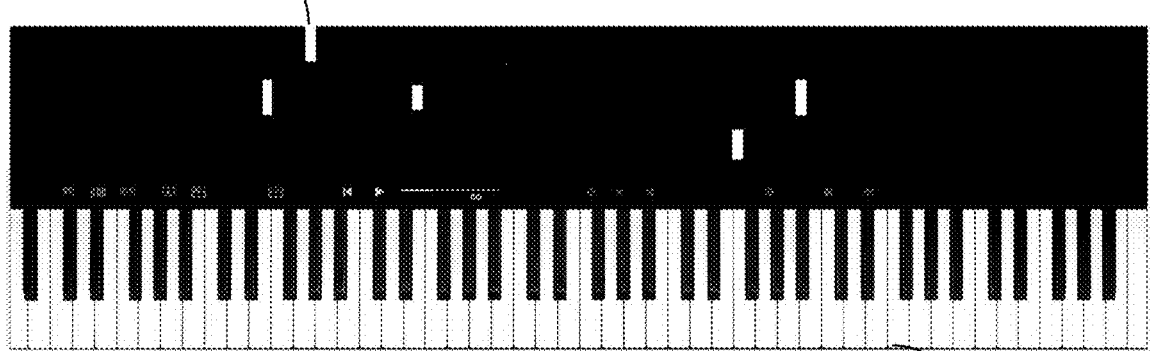
FIG. 9B is a schematic diagram illustrating an exemplary display manner using a key indicator according to some embodiments of the present disclosure.
Figure 9C:
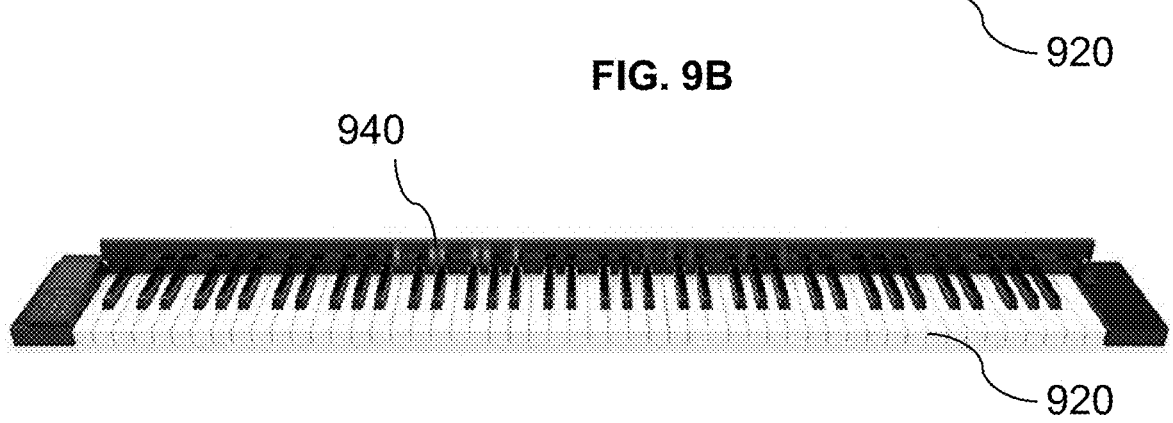
FIG. 9C is a schematic diagram illustrating an exemplary display manner using a light emitting diode array according to some embodiments of the present disclosure.

FIGS. 9A through 9C provide several schematic diagrams illustrating different display manners according to some embodiments of the present disclosure.

Referring to FIG. 9A, the musical system 100 may display a music score 910 on a display device (such as an LCD monitor or a TV screen etc.). The music score 910 may include an original music score, or a simplified music score. As illustrated, the musical system 100 may display different portions of the music score 910 on different portions of the display device. For example, notes played by left hand 911 may be displayed on the left side, and notes played by right hand 912 may be display on the middle side. A simplified music score 913, only including notes of the main theme of the music score 910, may be displayed on the right side. For example, the simplified music score 913 may include part of the music score 910, wherein the part of the music score may be a main theme of the music score 910. As another example, the simplified music score 913 may include those scores that match the user's performance level according to his/her statistical performance information, and may include no scores that are beyond the user's performance level. The musical system 110 may require its user only play the simplified music score 913, while the remainder notes of the musical score 910 may be played by the auto play module 470 of the musical system 110.

In some embodiments, different display devices (e.g., display devices of various types, shapes, sizes, etc.) may be selected and used for different types of keyboards 920. For example, the size of the display device may be adapted to the size of the keyboard 920. In some embodiments, the display device may include a screen. The size of the screen may be adjusted based on the size of the keyboard 920. For example, a display device with a larger size may be used for a keyboard (e.g., keyboard of a grand piano) with a relatively larger size; while a display device with a smaller size may be used for a keyboard (e.g., keyboard of an upright piano or a baby grand piano) with a relatively smaller size.

Referring to FIG. 9B, the musical system may use one or more key indicators 930 on the screen for simplifying a music score. The one or more key indicators 930 may be arranged in any suitable form. Merely by way of example, shape of the key indicators 930 may include bubble, rectangle, triangle, polygon, or the like, or any combination thereof. The one or more key indicators 930 may correspond to one or more actual keys on the keyboard 920. The key indicators 930 may be changed according to depressing strength and depressing time of the corresponding actual keys. In some embodiments, a length (e.g., a height of the rectangle-like key indicator) or a diameter (e.g., a diameter of a bubble-like key indicator) of the key indicator 930 may indicate the depressing strength of corresponding actual keys. Merely by way of example, the height of the rectangle-like key indicator or the diameter of the bubble-like key indicator may be gradually reduced after the corresponding actual keys are depressed. The key indicators 930 may also move from top of the display area to bottom in a velocity proportional to the depressing time of the corresponding actual keys.

Referring to FIG. 9C, the musical system 100 may include an LED array 940. The LED array 940 may be configured to indicate the keys to be depressed. The LED array 940 may emit beams of light (e.g., ultraviolet light, visible light, infrared light, etc.) to indicate keys to be depressed for a user (e.g., a player). In some embodiments, the LED array 940 may be installed above the keyboard 920.

In some embodiments, the LED array 940 may be double-colored. The double-colored LED array 940 may be configured to distinguish keys played by the left hand and the right hand. In some embodiments, the LED array 940 may be configured to indicate errors. For example, when a note was incorrectly played, the LED corresponding to the right key may blink, while the LED corresponding to the wrong keys may glow continuously in a different color.

It should be noted that the above embodiments are provided for the purposes of illustration, and not intended to limit the scope of the present disclosure. After consulting the present disclosure, one skilled in the art may envisage numerous other changes, substitutions, variations, alterations, and modifications without inventive activity, and it is intended that the present disclosure encompasses all such changes, substitutions, variations, alterations, and modifications, as falling within its scope. For example, notes played by the left hand and right hand may be presented on different screens of the display device while the corresponding keys may be indicated by the LED array 940

Figure 10:
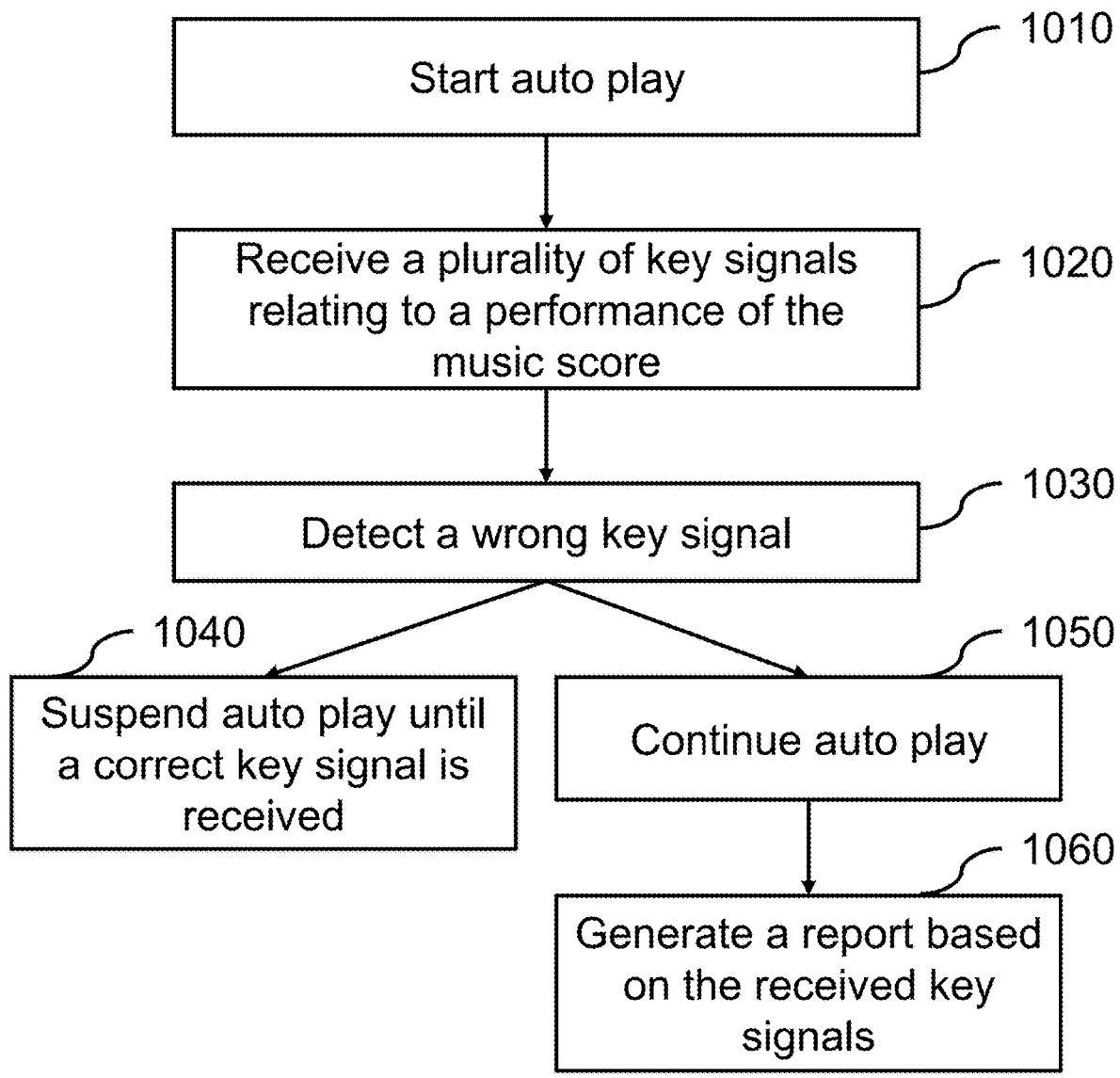
FIG. 10 is a flowchart illustrating a process for performing auto play according to some embodiments of the present disclosure.

FIG. 10 is a flowchart illustrating an exemplary method and/or process for performing auto play according to some embodiments of the present disclosure. The process and/or method may be executed by the musical system 110. For example, the process and/or method may be implemented as a set of instructions stored in the storage 320. The processor 310 may execute the set of instructions and may accordingly be directed to perform the process and/or method.

In step 1010, the auto play module 430 may start auto play of music. In some embodiments, before the auto play module 430 starts the auto play, the user information management module 410 or the simplification module 420 may select a music score to be played. The selected music score may be an original music score or a simplified music score. In some embodiments, before the auto play module 430 starts the auto play, one or more auto play parameters (e.g., a play speed) may be set. In some embodiments, the auto play module 470 may start the auto play based on instructions from a user.

In step 1020, the statistics unit 520 may receive a plurality of key signals relating to a performance of a music score. In some embodiments, the key signal may include an electric signal, such as an electrical current signal, a voltage signal, etc. The key signals may be generated based on motion information including a position of the key, timing information regarding motion of the key (e.g., a time point corresponding to depression of the key, a time point corresponding to release of the key, a time point corresponding to a specific position of the key, etc.), a depression strength, a velocity of the key during motion, or the like, or a combination thereof.

In step 1030, the statistics unit 520 may detect a wrong key signal. The wrong key signal may be a key signal that has a difference from a reference signal larger than a threshold value. For example, the statistic unit 520 may compare each of a plurality of key signals received from the musical components 112 with the reference signals. Both of the reference signals and the received plurality of key signals may correspond with a piece of music score, therefore the plurality of received key signals may correspond with the reference signals. When the difference between a key signal played by the user and the corresponding key signal from the reference music score is greater than a threshold, the statistics unit 520 may determine that the key signal is incorrect.

In some embodiments, the error information may include notes played incorrectly, notes played too fast or too slowly, types of rhythms played incorrectly, types of chords played incorrectly, an incorrect time point relating to a depression of a key, an incorrect time point relating to a release of the key, an incorrect strength applied to the key, an incorrect note duration, or the like, or a combination thereof. In some embodiments, the detected error information may be transmitted to any component in the musical system 100 (e.g., the display module 440, or the like). For example, the display module 440 may display the error information in real time.

In some embodiments, after the statistics unit 520 detects the error information, the auto play module 430 may suspend the auto play in step 1040 until a correct key signal may be received. In some embodiments, otherwise, after the statistics unit 520 detects the error information, the auto play module 430 may continue the auto play in step 1050. In some embodiments, whether the auto play may be suspended or continued may be predefined by a user (e.g., a player).

In some embodiments, in step 1040, while the auto play module 430 suspends the auto play, the display module 440 may display the detected error information. In some embodiments, the display module 440 may display a notification regarding an action (e.g., depressing a correct key) generated by the simplification module 420 or the user information management module 410. Merely by way of example, the display module 440 may indicate the correct key with a blinking LED.

In some embodiments, in step 1050, the auto play module 430 may continue the auto play according to user settings. For example, the auto play module 430 may maintain speed of the auto play unchanged. As another example, the auto play module 430 may reduce the speed of the auto play based on the error information. In some embodiments, the more notes are played incorrectly, the slower the speed of the auto play may be. In some embodiments, the simplification module 420 may generate a simplified music score based on the error information. For example, the more notes are played incorrectly, the easier the simplified music score may be. In some embodiments, if a simplified music score is selected before step 1010, simplification module 420 may further simplify the simplified music score based on the error information.

In step 1060, the statistics unit 520 may generate a statistical report based on the received key signals. In some embodiments, the statistical report may include a plurality of contents, including user account information, statistical information, or the like, or a combination thereof. The statistical information may include the number of notes, the number of chords, type of tone, correction rate, error information, error rate, or the like, or a combination thereof. More detailed descriptions regarding the statistical report may be found in FIG. 11 and the description thereof.

It should be noted that the above embodiments are provided for the purposes of illustration, and not intended to limit the scope of the present disclosure. After consulting the present disclosure, one skilled in the art may envisage numerous other changes, substitutions, variations, alterations, and modifications without inventive activity, and it is intended that the present disclosure encompasses all such changes, substitutions, variations, alterations, and modifications, as falling within its scope.

Figure 11:
FIG. 11 is a schematic diagram illustrating an exemplary statistical report according to some embodiments of the present disclosure.
Figure 11:
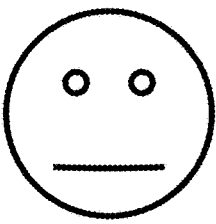
Figure 11:

FIG. 11 is a schematic diagram illustrating an exemplary statistical report according to some embodiments of the present disclosure. The exemplary statistical report may be a summarization of a performance of a music score. The summarization may include an abstract of a performance of a music score (e.g., perfect, correct, or incorrect) and error information (e.g., error rate, notes played incorrectly, rhythms played incorrectly, chords played incorrectly, or the like). In some embodiments, the statistical report may further include tips (not shown). The tips may include information regarding pieces suitable for practice, practice difficulty, practice frequency, or the like, or a combination thereof.

In some embodiments, the statistical report may be presented in a manner of, for example, number, text, table, chart (e.g., column chart, line chart, pie chart, bar chart, radar graph, area chart, scatter chart, or the like), picture, icon, video content, audio content, or the like, or a combination thereof. For example, types of notes, rhythms and/or chords played incorrectly may be presented as pie charts or scatter charts. As another example, notes played correctly or incorrectly may be presented as a symbol of a smiling face or a crying face.

In some embodiments, the statistical report may be stored in any storage (e.g., a local storage, a remote server, or the like) disclosed elsewhere in the present disclosure. In some embodiments, the statistical report may be shared via a content sharing platform (e.g., Youtube™, Youku™, etc.), a mobile platform, a social network platform, an email service, a phone service, a messaging service, and/or any other platform and/or service.

The statistical report described above are not exhaustive and are not limiting. Numerous other changes, substitutions, variations, alterations, and modifications may be ascertained to one skilled in the art and it is intended that the present disclosure encompasses all such changes, substitutions, variations, alterations, and modifications as falling within the scope of the present disclosure. For example, notes played correctly or incorrectly may be presented in different colors.

It should be noted that the above descriptions describe a piano as an example, but doesn't intend to limit the scope of the present disclosure. Any kind of musical instrument (e.g., violin, cello, etc.) may be applicable in this disclosure.

The flowcharts in this disclosure include a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

In some implementations, any suitable machine-readable storage media can be used for storing instructions for performing the functions and/or processes described herein. For example, in some implementations, storage media can be transitory or non-transitory. For example, non-transitory storage media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory storage media can include signals on networks, in wires, conductors, optical fibers, circuits, and any suitable media that is fleeting and devoid of any semblance of permanence during transmission, and/or any suitable intangible media.

The foregoing Detailed Description is to be understood as being in every respect illustrative and exemplary, but not restrictive, and the scope of the disclosure herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A musical system, comprising:
a plurality of sensors corresponding to a plurality of keys of a musical instrument, wherein each of the plurality of sensors is configured to sense a motion of at least one key of the plurality of keys and generate a key signal accordingly, wherein
each of the plurality of keys is connected with a non-transparent plate; and
each of the plurality of sensors includes a light-emitting element and a light-detecting element, wherein the light-emitting element and the light-detecting element are positioned under a corresponding key, and the non-transparent plate partially prevents the light-detecting element from receiving a light emitted by the light-emitting element;
one or more storage media comprising a set of instructions for modifying a music score for a user based on a performance level of the user; and
at least one processor configured to communicate with the one or more storage media, wherein when executing the set of instructions, the at least one processor is directed to:
determine a user performance level of a user; and
provide a modified music score for the user by removing at least one music unit from the music score based on the user performance level, wherein the at least one music unit is auto-played by the musical system during the user playing the music score.

2. The system of claim 1, wherein the user performance level is determined based on characteristics of the user's performance which is determined based on statistics of the user's historical performance records.

3. The system of claim 2, wherein the modified music score is an individualized modified music score based on the characteristics of the user's performance; and wherein the characteristics of the user's performance comprise the user's habitual performance.

4. The system of claim 2,
wherein to obtain the statistics of the user's historical performance records, the at least one processor is further directed to:
receive a plurality of key signals associated with a performance of the music score;
for each of the plurality of key signals:
compare the key signal with a corresponding reference signal in a reference music score;
determine an error based on the comparison; and
record a result of the determination as a historical performance record.

5. The method of claim 4, wherein to obtain the statistics of the user's historical performance records, the at least one processor is further directed to:
divide the reference music score into a plurality of reference music units, wherein each of the plurality of reference music units corresponds to at least one reference signal in the reference music score;
compare the plurality of key signals with a plurality of reference signals in the reference music score according to the plurality of reference music units; and
determine at least one of an accuracy rate or an error rate based on the comparison.

6. The system of claim 2, wherein the statistics of the user's historical performance records comprise at least one of a number of notes, a number of chords, a type of tone, an accuracy rate, an error rate, notes played incorrectly, an incorrect rhythm, types of chords played incorrectly, an incorrect time point relating to a depression of a key, an incorrect time point relating to a release of the key, an incorrect strength applied to the key, or an incorrect note duration.

7. The system of claim 1, further comprising a display configured to display the modified music score.

8. The system of claim 7, wherein the display is further configured to display a statistical report associated with the music score played by the user.

9. The system of claim 1, wherein an error rate of the at least one music unit historically played by the user is higher than a predetermined threshold value.

10. The system of claim 1, further comprising an actuator configured to auto play the at least one music unit of the music score.

11. A method for music score modification, executed by a musical system, comprising:
determining, by at least one processor, a user performance level of a user; and
providing, by the at least one processor, a modified music score for the user by removing at least one music unit from the music score based on the user performance level, wherein the at least one music unit is auto-played by the musical system during the user playing the music score;
wherein the musical system includes a plurality of sensors corresponding to a plurality of keys of a musical instrument, wherein each of the plurality of sensors is configured to sense a motion of at least one key of the plurality of keys and generate a key signal accordingly, wherein
each of the plurality of keys is connected with a non-transparent plate; and
each of the plurality of sensors includes a light-emitting element and a light-detecting element, wherein the light-emitting element and the light-detecting element are positioned under a corresponding key, and the non-transparent plate partially prevents the light-detecting element from receiving a light emitted by the light-emitting element.

12. The method of claim 11, wherein the user performance level is determined based on characteristics of the user's performance which is determined based on statistics of the user's historical performance records.

13. The method of claim 12, wherein the modified music score is an individualized modified music score based on the characteristics of the user's performance; and wherein the characteristics of the user's performance include the user's habitual performance.

14. The method of claim 12, further comprising:
receiving a plurality of key signals associated with a performance of the music score;
for each of the plurality of key signals:
comparing the key signal with a corresponding reference signal in a reference music score;
determining an error based on the comparison; and
recording a result of the determination as a historical performance record.

15. The method of claim 14, further comprising:
dividing the reference music score into a plurality of reference music units, wherein each of the plurality of reference music units corresponds to at least one reference signal in the reference music score;

comparing the plurality of key signals with a plurality of reference signals in the reference music score according to the plurality of reference music units; and determining at least one of an accuracy rate or an error rate based on the comparison.

16. The method of claim 11, further comprising:

displaying, by a display of the musical system, the modified music score.

17. The method of claim 16, further comprising:

displaying, by a display of the musical system, a statistical report associated with the music score played by the user.

18. The method of claim 11, wherein an error rate of the at least one music unit historically played by the user is higher than a predetermined threshold value.

19. The method of claim 11, further comprising:

auto playing, by an actuator of the musical system, the at least one music unit of the music score.

20. The method of claim 11, wherein the statistics of the user's historical performance records comprise at least one of a number of notes, a number of chords, a type of tone, an accuracy rate, an error rate, notes played incorrectly, an incorrect rhythm, types of chords played incorrectly, an incorrect time point relating to a depression of a key, an incorrect time point relating to a release of the key, an incorrect strength applied to the key, or an incorrect note duration.

* * * * *